Nov. 19, 1935.  A. J. LA CROIX  2,021,656
KNIFE
Filed Nov. 19, 1934
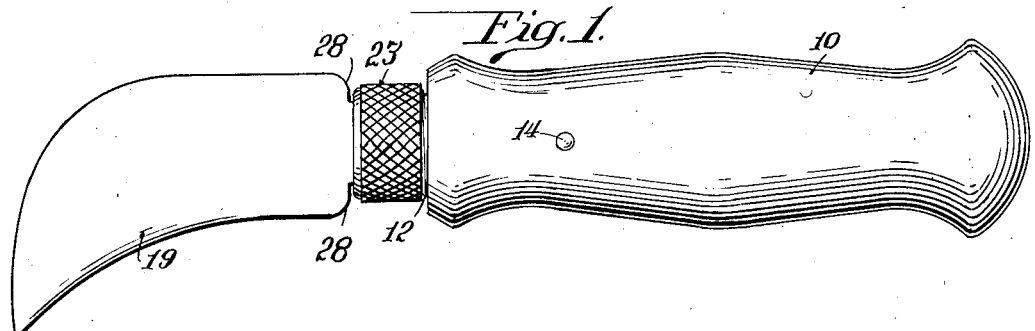
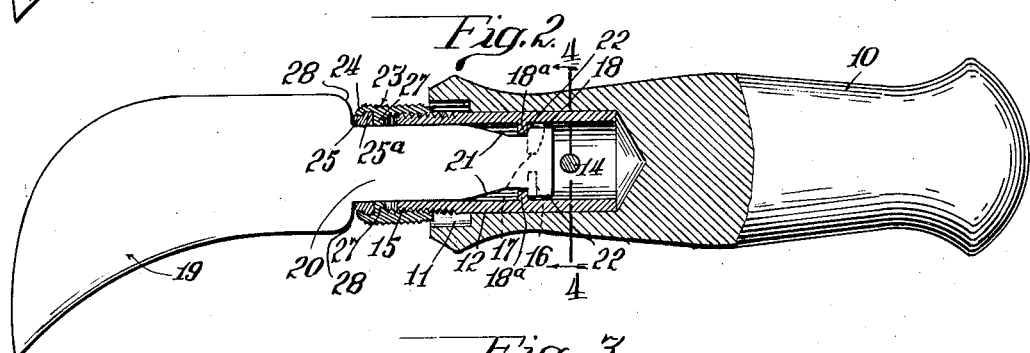
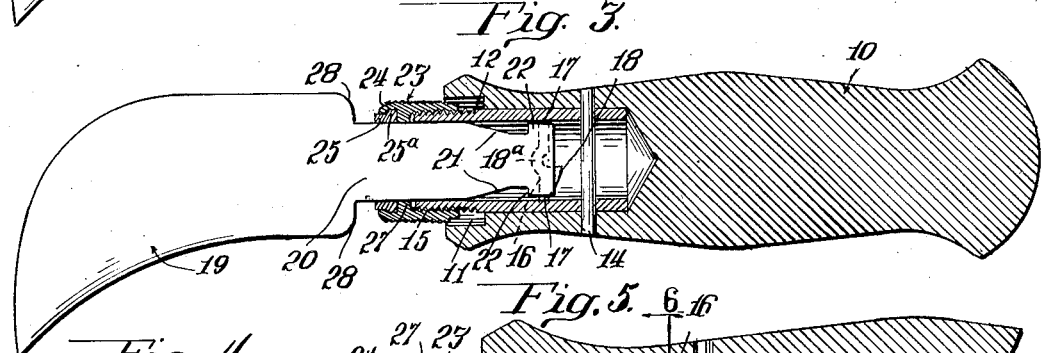
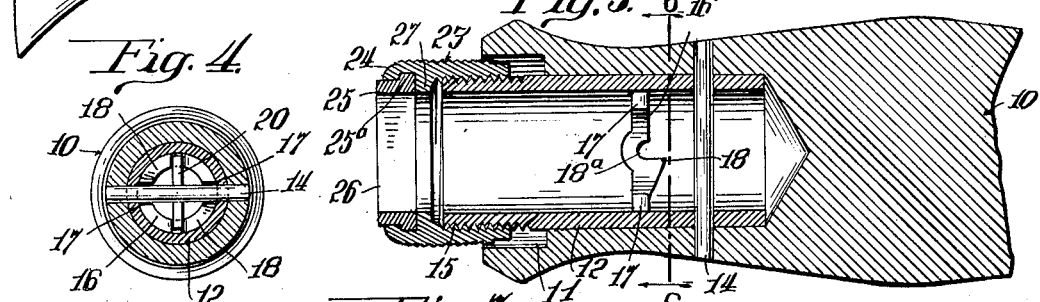
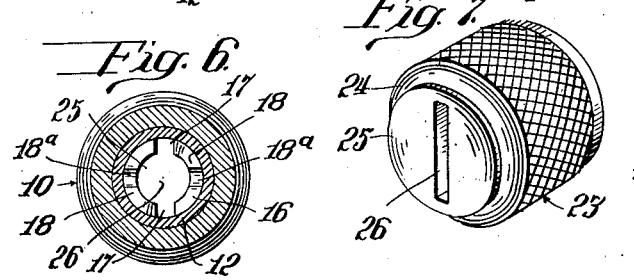
Inventor
Arthur J. La Croix
By George Heidman
Attorney.

Patented Nov. 19, 1935

2,021,656

UNITED STATES PATENT OFFICE 2,021,656

KNIFE

Arthur J. La Croix, Southbridge, Mass., assignor to Hyde Manufacturing Company, Southbridge, Mass., a corporation of Massachusetts Application November 19, 1934, Serial No. 753,693

3 Claims. (Cl. 279—91)

My invention relates to a knife which is more especially adapted to the cutting of linoleums and the like and wherein the blade is removably held in place to enable the blade to be repeatedly sharpened and replacement of the blade readily made should occasion require.

The invention has for its object the provision of a rather simple and inexpensive means whereby the blade will be effectively and immovably held in proper position in the knife handle while at the same time permitting the blade to be easily released and removed to be replaced by another type of blade adapted for other uses and arranged to be employed with the handle portion of the knife.

The invention, somewhat generally stated, comprises a handle provided at one end with a socket adapted to receive the shank portion of the blade; the shank portion of the blade and the socket of the handle being provided with cooperating surfaces adapted to interengage and hold the blade against lengthwise movement; and means having adjustable engagement with the socket-end of the handle whereby the blade will be locked in place when said means is moved into a predetermined relation with the handle.

The objects of my invention and its advantages will all be more fully comprehended from the following detailed description of the accompanying drawing, wherein—

Figure 1 is a side elevation of the knife embodying my invention.

Figure 2 is a longitudinal sectional view of one end of the handle and of the blade holding means, with the other end of the handle and the blade shown in elevation and the latter locked in place.

Figure 3 is a similar view with the handle given a partial rotation about the axis of the blade and showing the blade holding means and blade in releasing position.

Figure 4 is a cross-sectional view taken substantially on the line 4—4 of Figure 2 and looking in the direction of the arrows.

Figure 5 is an enlarged longitudinal sectional view of the blade receiving end of the handle with the blade removed.

Figure 6 is a cross sectional view taken substantially on the line 6—6 of Figure 5, looking in the direction of the arrows.

Figure 7 is a perspective view of the blade locking member.

The embodiment of the invention as disclosed in the drawing comprises the handle 10 of suitable formation and of wood or any suitable material, and one end thereof provided with a bore of predetermined length, with the orifice of the bore countersunk or slightly enlarged as shown at 11 for reasons hereinafter set forth.

This bore of the handle is intended to receive a sleeve member 12 of predetermined length somewhat greater than the depth of the bore, and this sleeve member 12, aside from having a snug fit in the bore of the handle is also held against any movement in the handle by a cross-pin 14. As the sleeve member is of greater length than the depth of the bore one end of the sleeve is allowed to protrude beyond the end of the handle; and this outer end of the sleeve is externally threaded as shown at 15. The sleeve 12, at a predetermined distance removed from its inner end, is provided on its inner circumference with an interrupted or sectional flange 16 disposed circumferentially except for the diametrically opposite gaps or openings 17, 17 formed by spacing the flange segments a suitable distance apart.

Each segment of the interrupted flange 16 at points intermediate of the gaps or openings, preferably substantially ninety degrees removed from the gaps, is laterally off-set or enlarged rearwardly to provide a shoulder or stop 18 on the side of the interrupted flange disposed toward the inner end of the sleeve. Each segment adjacent the shoulder 18 is dished toward the outer or opposite end of the sleeve so as to provide a socket 18ᵃ.

The blade 19 is provided with a shank 20 of transverse width somewhat less than the inner diameter of the sleeve 12 to permit the shank of the blade to be easily inserted into the sleeve. The inner end of the blade-shank on opposite edges is cut away as at 21 so as to provide the shoulders 22, 22 and to reduce the width of the shank adjacent the shoulders 22, 22 so that this reduced portion of the blade-shank may fit into the circle or diametrical space between the flange-segments after the shouldered end of the blade-shank has passed through the openings or gaps 17, 17 between the flange segments, as shown, for example, in Figures 2 and 4.

As is apparent from this construction, the blade-shank 20 can be completely inserted in place only when the end of the shank registers with the openings or gaps 17, 17, at which time the deepest portions of the cut-out edges of the blade-shank, namely the portions adjacent the shoulders 22, 22, will then be in position to receive the segments of the flange 16 upon slight rotative movement either of the handle or of the blade.

The rotative movement of either handle or blade will cause the shouldered end of the shank to enter the sockets 18ᵃ and engage with the shoulders 18, 18 on the flange segments.

In order to lock the blade in place and to hold the shouldered end of the shank in the sockets, I provide an internally threaded annular member or ferrule 23 provided at one end with an inturned flange as at 24. This flanged end of the ferrule 23 is provided with a disc 25 intended to be held in the ferrule by the inturned flange 24 which engages an annular shoulder 25a on the disc. The disc is free to rotate on the flange 24 and is provided with a transverse slot 26 of length sufficient to receive the shank 20 of the blade. The interior of the ferrule 23 is threaded to a point slightly spaced from the disc 25 where the ferrule is provided with a flange 27 which engages the inner face of the disc and holds the latter in place between flanges 24 and 27, while permitting the free rotative movement between the ferrule and the disc. That is to say, the ferrule 23 may be screwed lengthwise of the sleeve 12 while the disc 25, through which the blade-shank 20 extends, may be held stationary.

As clearly shown in the drawing, the shank 20 of the blade is of lesser width than the blade proper so that shoulders are provided at 28; and the blade proper being of width greater than the length of slot 26 in the disc 25 the ferrule may be screwed outwardly into abutting relation with the shoulders 28.

In order to secure the knife blade 19 in the handle 10, it is essential to screw the ferrule 23 down on the sleeve 12 or inwardly until it enters the flared orifice 11 of the bore, when the notched inner end of the blade-shank 20 will be able to extend sufficiently within the sleeve 12, where the notched inner end can be passed through the openings 17, 17 between the flange segments 16 and the blade, or the handle, given a partial rotation sufficiently to bring the shoulders 22, 22 of the blade-shank into engagement with shoulders 18. Upon screwing the ferrule outwardly, namely in unscrewing direction, the shoulders 22, 22 of the blade-shank will immediately be drawn into the sockets 18a and the position of the blade relative to the sockets maintained and locked in position by reason of the ferrule 23 being brought into firm engagement with the shoulders 28, 28 of the blade. As the disc 25 is free to rotate in the ferrule, the blade may be inserted into place by dropping the blade through the slot of the disc (ferrule 23 having previously been screwed inwardly) and through the openings between the flange segments and then upon screwing the ferrule in the opposite direction will force the blade against the shoulders 18, preventing its further rotative movement and causing its shoulders to be drawn into the sockets.

This will lock the blade in position and prevent any rotative movement of the blade relative to the handle and also prevent longitudinal movement of the blade because of the abutting relation between the shoulders 28 of the blade and the protruding surface of the disc 25 of ferrule 23. The lower or inner end of the blade-shank can not be withdrawn until the shank is brought to register with the gaps or openings 17, 17. In order to accomplish such movement of the shank there must be sufficient play between the shoulders 28 of the blade and the disc of the ferrule. It is apparent, therefore, that the blade must have sufficient movement longitudinally into the sleeve in order to permit the shoulders 22, 22 of the blade-shank to clear or move out of the sockets in the interrupted flange and ride along the inner surfaces of the flange-segments. It is evident therefore that the blade will be securely locked in place and held against rotative movement.

In order to remove the blade, the ferrule 23 must be screwed down on the sleeve 12 until the ferrule enters the enlarged orifice 11. This permits the shouldered end of the blade-shank to move out of the sockets in the flange segments 16 and the blade-shank brought to register with the gaps or openings 17, 17, allowing the blade to be entirely withdrawn for purposes of sharpening or to be replaced by another blade.

As a guide for the insertion of the blade, the holding pin 14 is inserted through the handle and the sleeve 12 so as to extend parallel with the openings 17, 17 between the flange segments; and with the ends of the pin visible on the handle exterior, the blade should be held to align and extend parallel with the pin which will present the end of the shank in line with the openings.

The structure disclosed is believed to be the best embodiment of the invention and has been described in terms which are employed merely as terms of description and not as terms of limitation, as structural modifications are possible and may be made without, however, departing from the spirit of my invention.

What I claim is:

1. In a device of the character described provided with a handle, a cylindrical member adapted to be secured to the handle and externally threaded at one end, the member on its interior at a predetermined distance from its ends being provided with a sectional annular flange, the sections being spaced apart at their ends at diametrically opposite points in the member, said flange sections on their faces disposed toward the inner end of the member being each provided with a shoulder, and blade shank receiving means adapted to screw lengthwise on the threaded end of the member so as to extend the distance between said means and said sectional flange.

2. In a device of the character described, a cylindrical member threaded at one end and provided with a sectional annular flange on its interior intermediate of its ends; the sections being spaced apart so as to provide passageways at diametrically opposite points, the flange sections on their faces disposed toward the inner end of the member having sockets, and a ferrule member adapted to screw lengthwise of said cylindrical member, said ferrule being provided with a disc rotatably mounted in said ferrule and provided with a transverse slot adapted to receive a flat sided shank of a blade or tool.

3. A device of the character described for securing the shank of a blade or tool to a handle, comprising an elongated cylindrical member threaded exteriorly at one end while the other end is adapted to be secured to the handle, the member on its interior and intermediate of its ends being provided with an annular flange having cut out portions at diametrically opposite points, the flange on its inner face being provided with arresting surfaces, an internally threaded ferrule adapted to screw lengthwise of said member, the outer end of the ferrule being provided with a disc rotatably mounted in the ferrule and provided with a transverse slot of length corresponding with the internal diameter of said member, said slot being adapted to receive a flat sided shank of a blade or tool provided with a reduced portion at a distance removed from the inner end approximating the inner diameter of said flange.

ARTHUR J. LA CROIX.